US011860984B1

(12) United States Patent
Ashley et al.

(10) Patent No.: US 11,860,984 B1
(45) Date of Patent: Jan. 2, 2024

(54) PERSONA BASED PRIVACY BROWSER

(71) Applicant: Anonyome Labs, Inc., Draper, UT (US)

(72) Inventors: Paul Ashley, Toowong (AU); Simon Gee, Varsity Lakes (AU); Steven Harvey McCown, Mapleton, UT (US); John David Mumford, Portola Valley, CA (US); Greg Clark, San Francisco, CA (US)

(73) Assignee: Anonyome Labs, Inc., Salt Lake City, UT (US)

( * ) Notice: Subject to any disclaimer, the term of this patent is extended or adjusted under 35 U.S.C. 154(b) by 182 days.

(21) Appl. No.: 16/877,976

(22) Filed: May 19, 2020

Related U.S. Application Data

(60) Provisional application No. 63/006,377, filed on Apr. 7, 2020.

(51) Int. Cl.

| | |
|---|---|
| ***G06F 9/44*** | (2018.01) |
| ***H04L 29/06*** | (2006.01) |
| ***G06F 21/31*** | (2013.01) |
| ***G06F 16/955*** | (2019.01) |
| ***G06F 16/9535*** | (2019.01) |

(52) U.S. Cl.
CPC .......... *G06F 21/316* (2013.01); *G06F 16/955* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 7,086,008 B2 * | 8/2006 | Capps | G06F 9/44505 | 715/762 |
| 9,965,133 B1 * | 5/2018 | Lindsey | G06F 21/53 | |
| 2003/0131260 A1 * | 7/2003 | Hanson | H04L 63/0414 | 713/194 |
| 2009/0125521 A1 * | 5/2009 | Petty | G06F 21/6263 | 707/999.009 |
| 2012/0304286 A1 * | 11/2012 | Croll | G06F 21/6263 | 726/22 |
| 2016/0117164 A1 * | 4/2016 | Laadan | G06F 9/4451 | 713/1 |
| 2021/0014327 A1 * | 1/2021 | Boss | H04W 4/029 | |

FOREIGN PATENT DOCUMENTS

| | | | | |
|---|---|---|---|---|
| IL | 206271 A * | 9/2014 | G06F 16/9537 |
| WO | WO-2013061156 A2 * | 5/2013 | G06F 3/04817 |
| WO | WO-2013124850 A1 * | 8/2013 | G06F 3/04817 |
| WO | WO-2013128440 A1 * | 9/2013 | G06F 17/30864 |

* cited by examiner

*Primary Examiner* — Natisha D Cox
(74) *Attorney, Agent, or Firm* — Cooley LLP

(57) ABSTRACT

A non-transitory computer readable storage medium with instructions executed by a processor maintains different digital identities for different internet browsing personas associated with a real user. Persona selection rules are invoked to automatically designate a selected digital identity for a current internet browsing session. Browser state for the selected digital identity is loaded.

13 Claims, 10 Drawing Sheets

PERSONA BASED PRIVACY BROWSER

CROSS-REFERENCE TO RELATED APPLICATION

This application claims priority to U.S. Provisional Patent Application Ser. No. 63/006,377, filed Apr. 7, 2020, the contents of which are incorporated herein by reference.

FIELD OF THE INVENTION

This invention relates generally to communications in computer networks. More particularly, this invention is directed towards techniques for operating multiple anonymous digital identities for privacy protection.

BACKGROUND OF THE INVENTION

With the current state of identity theft, uncontrolled collection of PII (personally identifiable information) and targeted marketing, there is a need for a user to protect their own privacy when online. The most common method for users to interact with online services is through a browser (e.g. Chrome®, Safari®, Firefox®, Edge®). Although browsers are extremely useful for users, they unfortunately provide an excellent mechanism for data brokers (Facebook®, Google®, and others) to collect personal information about their users. Through various tracking mechanisms in the browser, these data brokers can get a complete picture of a user's browsing habits, purchasing history, preferences, social network and other personal information.

To give some privacy protection to the user and to provide enhanced management, some browsers have introduced the concept of compartmentalization. FIG. 1 illustrates prior art compartmentalization where a single person has a work persona, a social persona and a shopping persona. Each persona may have separate cookies, bookmarks, search history, search engine utilization, tracker, tabs and plug-ins.

One example is Firefox®, which through its multi-account container extension, allows a user to create different tabs in their Firefox® browser for different aspects of their life, e.g. personal, work, banking, shopping and so on. The Firefox® extension separates its website storage into these tab-specific containers, e.g. so that tracking cookies downloaded by one container are not available to other containers. This compartmentalization makes management of online interactions more convenient for the user and makes it more difficult for data brokers to track users across these containers.

Another example is provided by the Chrome® browser. The feature called Profiles allows a user to create different Chrome® browser instances, enabling full separation of different bookmarks, extensions, plug-ins, and settings. In this model, when the user changes a Profile, the browser instance state is saved, and a new browser instance is launched and loaded with the saved state for that new Profile. This compartmentalization is aimed at both helping the user manage online interactions and also to make it more difficult for data brokers to track the user.

Although both of these compartmentalized browser solutions provide a measure of privacy and improved manageability for the user, they do not provide a complete solution. If the user wants to form fill attributes (e.g., name, phone number, email address, home address), form fill account login information (e.g., for a Twitter® account), launch email, voice calling or other services from within the browser, the user is not able to do that in a consistent and easy to manage way. It is very difficult and error prone for the user to try implement "mental" attribute and service compartmentalization, providing the browser with different instantiations for each profile.

SUMMARY OF THE INVENTION

A non-transitory computer readable storage medium with instructions executed by a processor maintains different digital identities for different internet browsing personas associated with a real user. Persona selection rules are invoked to automatically designate a selected digital identity for a current internet browsing session. Browser state for the selected digital identity is loaded.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION

Figure 1:
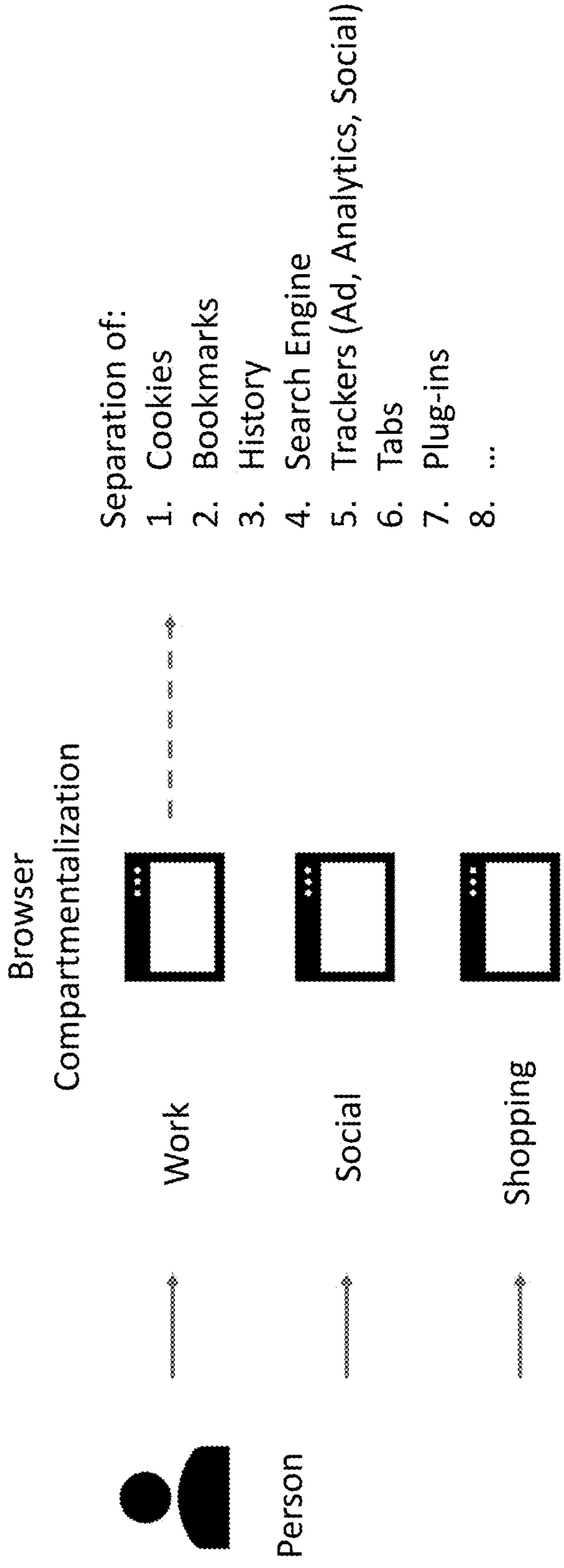
FIG. 1 illustrates prior art browser compartmentalization.
Figure 2:
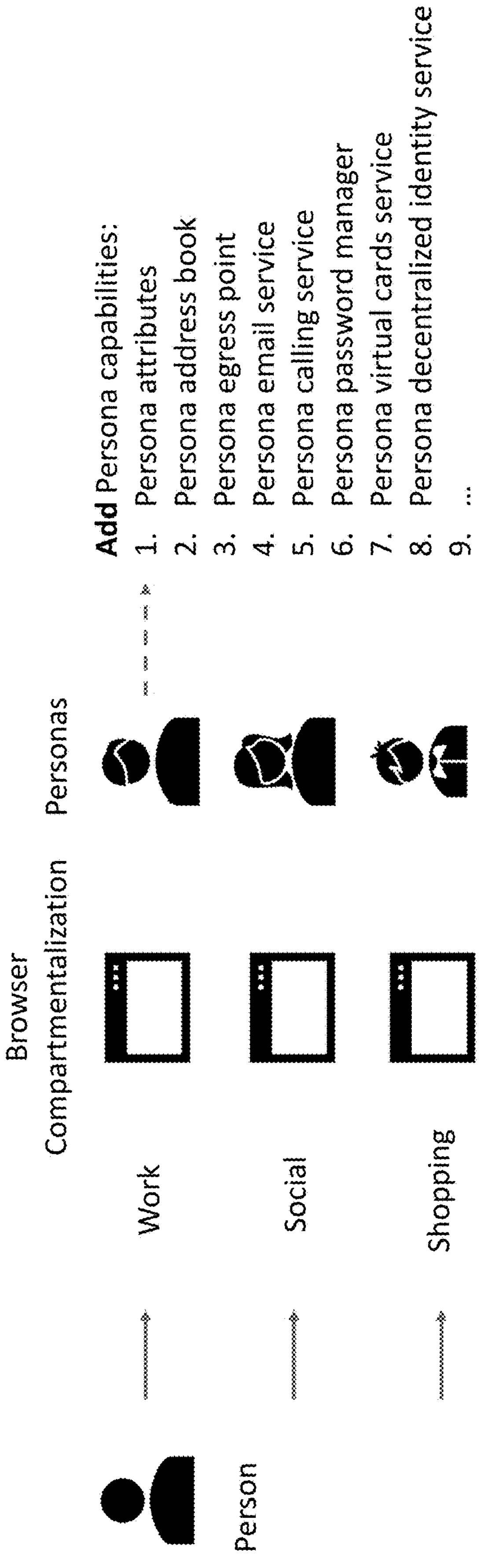
FIG. 2 illustrates persona capabilities utilized in accordance with an embodiment of the invention.

It would be desirable to have a compartmentalized browser solution that is integrated with a corresponding set of compartmentalized attributes and services. The disclosed technology integrates the compartmentalized browser concept with the persona concept through a fully equipped, user-managed persona with its own attributes and services. FIG. 2 illustrates a person with a work identity, a social identity and a shopping identity. Each identity has browser compartmentalization and an associated persona. The persona may have persona capabilities, such as persona attributes, persona address book, persona egress point, persona email service, persona calling service, persona password manager, persona virtual cards service and persona decentralized identity service.

This allows the browser to not only compartmentalize the browser configuration and state (as described in the earlier Firefox® and Chrome® compartmentalization examples), but in addition adds browser integration with a range of persona specific attributes and services. The selection of the persona is automated; this improves usability and minimizes errors. This provides the user with a much more easily managed and stronger compartmentalized privacy browser based experience.

Figure 3:
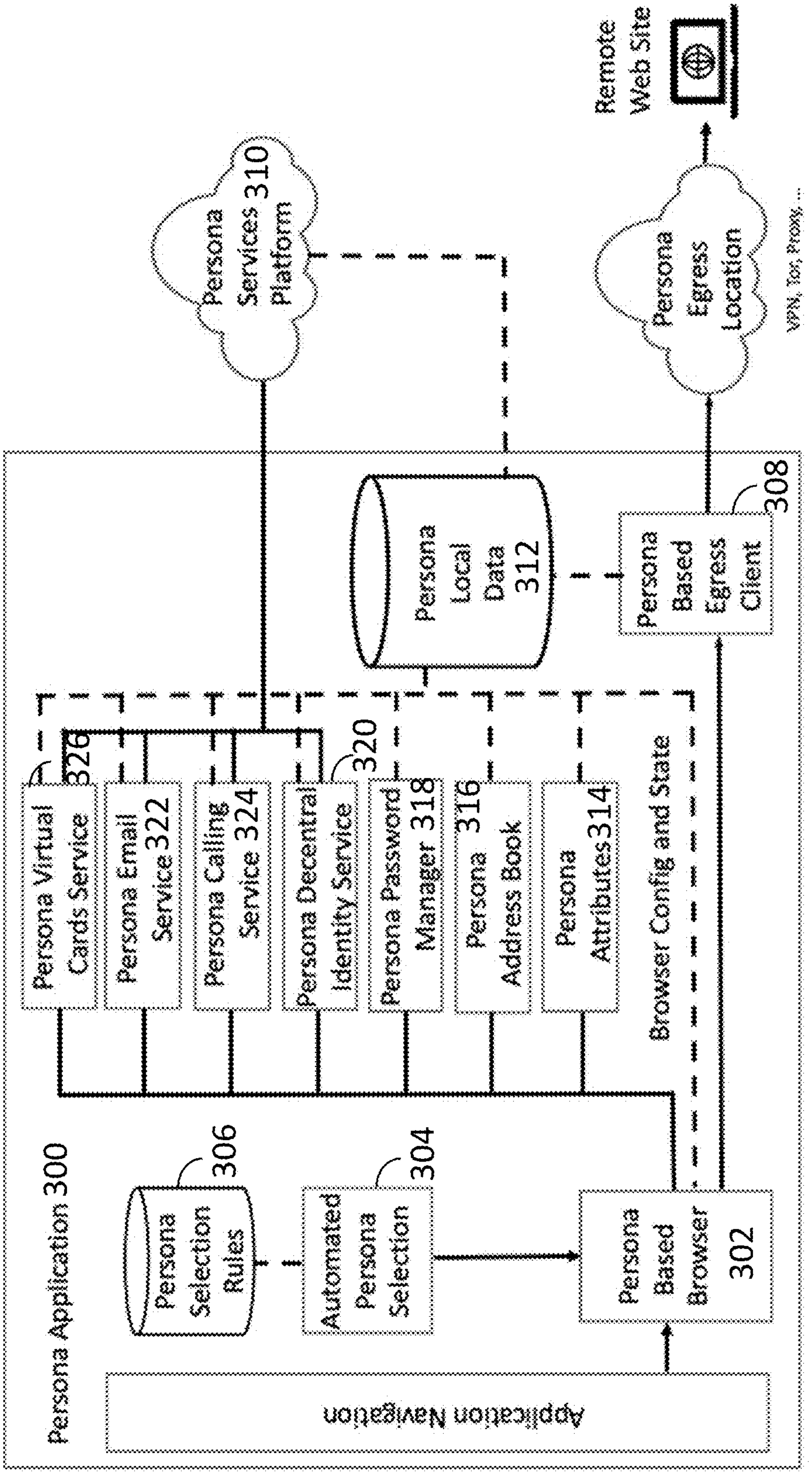
FIG. 3 illustrates a persona based privacy browser configured in accordance with an embodiment of the invention.

FIG. 3 shows an overview of the Persona Based Privacy Browser solution. In the figure is a Persona Based Application 300 (e.g., for mobile, desktop) that allows a user to open a Persona Based Browser 302. One example of a Persona based application is MySudo™ from Anonyome Labs, Salt Lake City, Utah. The Automated Persona Selection component 304 selects the persona for the user using a set of Persona Selection Rules 306. Once selected, the browser is launched under the context of the selected persona:

The browser is configured with its persona based configuration, e.g. history (to store or not to store), search engine (Google, DuckDuckGo, StartPage, . . . ), trackers (on/off, whitelists, . . . ).

The browser is also loaded with the persona's previous browser state, e.g. cookies, bookmarks, history, tabs. If this is a new persona, then the browser will start with an empty state.

The egress client 308 is configured for the desired egress location of the persona, e.g. US West Coast, Australia Sydney, and the egress technology e.g. VPN, TOR and proxy.

The persona application 300 may interact with a persona services platform 310, which stores persona data and downloads it to the persona application to form persona local data 312.

As the user begins to operate in the browser 302 the attributes and services of the persona are available:

The persona's attributes 314 are available for form filling e.g. name, date of birth, email address, phone number, shipping address, billing address, virtual credit cards.

The persona's address book 316 is available to search. Each persona may have a different set of contacts.

The persona's login account information for a service is available via a persona based password manager 318.

The persona's decentralized identity information and supporting service 320 is available so that the user can initiate and respond to relationship requests (e.g., pair-wise DID exchanges), accept verifiable credentials, present proofs, and initiate and perform passwordless based login.

The user is able to launch email from the browser in the context of the persona (initiated using the HTML tag, e.g. mailto:) using persona email service 322.

The user is able to launch voice calling from the browser in the context of the persona (initiated using the HTML tag, e.g. tel:) using persona calling service 324.

The user is able to request a persona based virtual credit card using persona virtual card service 326. This allows a user to have privacy and identity protection in a shopping situation.

This is just an illustrative set of persona data and services available to the browser.

The Persona Local Data 312 is data stored on the device, e.g. mobile, desktop, that enables the browser to access persona based attributes immediately (without the necessity of making callouts to a cloud service, such as persona services platform 310).

The Persona Services Platform 310 performs two functions. It provides the persona based services, e.g. email, calling, virtual credit cards, decentralized identity, which are initiated from within the browser. It also provides an encrypted backup option for the Persona Local Data.

A key privacy concept is the use of digital personas for compartmentalization or grouping of service interactions. Rather than a user performing all service interactions with the one identity, the user will create multiple digital personas and use them for different purposes. Each persona has its own unique identity attributes that may include name, handle, phone number, email address, virtual credit cards, virtual private network (VPN) configuration, browser state, log-in credentials, and shipping address. Each persona should be used for a limited and specific purpose. Consequently, any tracking done on an individual user persona would not form a complete picture of the user's activity, since they will operate using various personas. The personas act as a personal privacy proxy, not allowing people and online services direct access to the user's personal identity.

Personas can help the user in a number of ways. Not only do personas assist in protecting the privacy of the user, but they also assist in the management of the user's online and offline interactions. Using separate activity-based personas will naturally compartmentalize the user's various interactions by grouping them in a manageable way, such as: work persona, selling persona, web searching persona, shopping persona, etc. For example, the user may have a work-related social account (e.g., Twitter®), and a personal related social account on the same platform. Separating the social account information and communication by personas (e.g., work and social personas), helps the user to manage these two interactions and to keep them completely separate. Another advantage of the digital personas is that they can be temporary, such as a persona can be established for a particular relationship or transaction and can then be deleted when it is no longer needed.

An important requirement is to allow for the Privacy Browser 302 to be operated under a different configuration for each persona. When the user opens their Persona Based Browser 302, the persona is automatically selected. The selection of the persona is based on Persona Selection Rules 306, which are set up in advance. This improves usability and reduces errors by the user.

Figure 4:
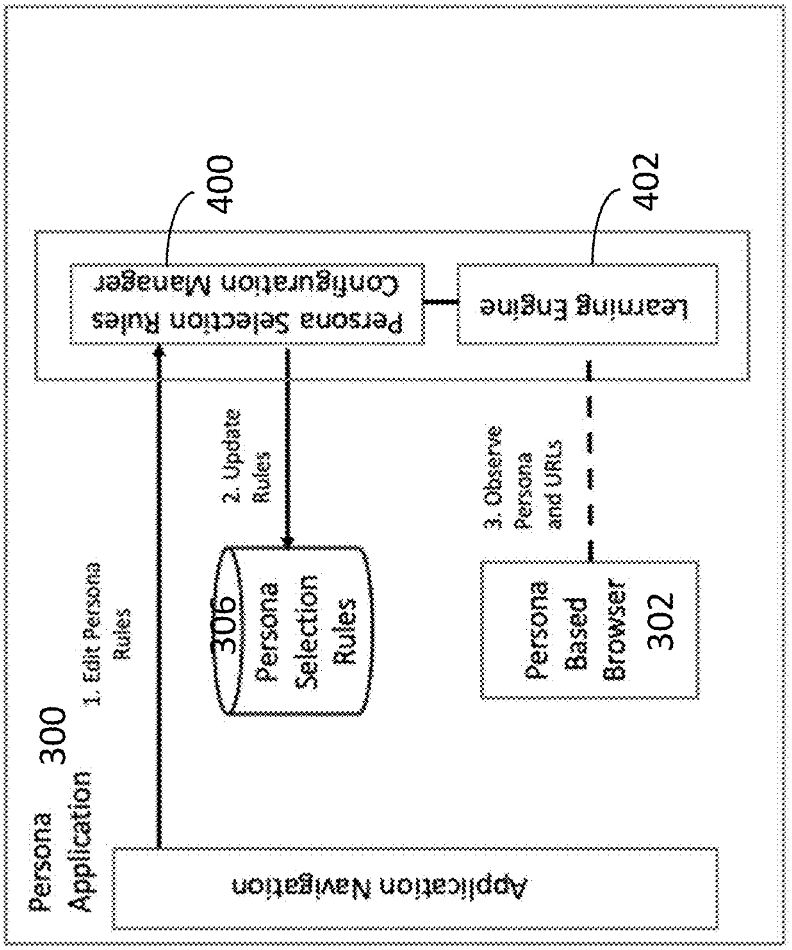
FIG. 4 illustrates configuring persona selection rules.

FIG. 4 shows how these rules are established. The user selects to Edit the Persona Selection Rules by accessing the Persona Selection Rules Configuration Manager 400. It allows the user to create rules for the Persona based on a number of different areas:

Location

Time

Network

Uniform Resource Locator (URL) address

This is a sample set of rule categories. Other rule categories may be used in accordance with other embodiments of the invention.

In addition, the Persona Application 300 includes a learning engine 402 that is able to monitor the activity of the user in the Persona Based Browser 302, so that new rules can be established on the user's behalf. For example, if the user always accesses Amazon.com using their shopping persona, then this behavior is learned by the system. Then if the user has another persona active, e.g. work, and browses to Amazon.com, the user can be asked whether they want to change persona.

Below are some example rules for automatically selecting the persona. The first persona selection rule is based on the user's physical location, using their current GPS coordinates. Rule 1 may be expressed as:

```
<context>
<area>location</area>
<data type>gps</data type>
<data>gps coordinates</data>
</context>
<Rule>
<Persona>sport</Persona>
</rule>
```

A second persona selection rule is based on the time of day. Rule 2 may be expressed as:

<context>
<area>time</area>
<data type>device time</data type>
<data>between 9 am and 6 pm</data>
</context>
<Rule>
<Persona>work</Persona>
</rule>

A third persona selection rule is based on the network address of the user device. Rule 3 may be expressed as:

<context>
<area>network</area>
<data type>IP address</data type>
<data>9.1.1</data>
</context>
<Rule>
<Persona>shopping</Persona>
</rule>

Figure 5:
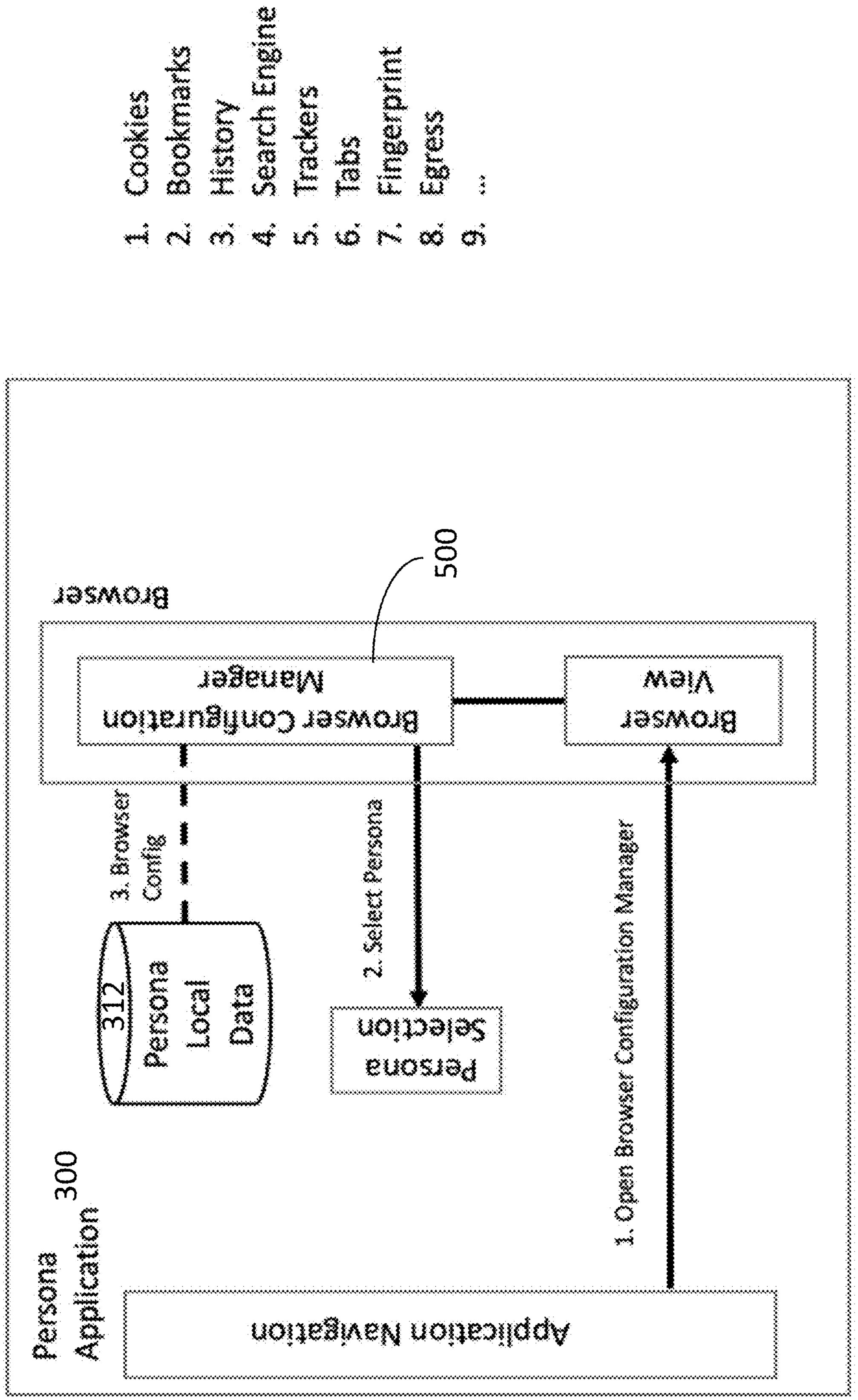
FIG. 5 illustrates managing privacy browser configuration.

FIG. 5 shows the process for managing the privacy browser configuration:

1. The user opens the Browser Configuration Manager 500.
2. The user selects a persona.
3. The Browser Configuration Manager updates the browser in the context of the selected persona by accessing persona local data 312.

The Browser Configuration Manager 500 allows the user to select individual settings for the browser for the selected persona. This includes:

- Cookies: Whether the cookies should be persistent (most common case) or deleted (sometimes called Incognito or privacy mode) across browser sessions.
- Bookmarks: Whether the browser should persist bookmarks across browser sessions.
- History: Whether the browser should keep a history log of the user's browsing and persist it across browser sessions.
- Search Engine: Allows the user to decide for this persona which search engine to default to. Common examples are Google®, DuckDuckGo®, StartPage®, and Bing®.
- Trackers: Whether ad, analytic and social trackers should be enabled. Also for each of these trackers allowing the user to configure whitelists.
- Tabs: Whether the browser should persist tabs created in the browser across browser sessions.
- Fingerprint: Whether the browser should provide a static fingerprint (e.g., based on the actual browser technology and configuration) or should provide a variable fingerprint (e.g., changes declared browser technology and configuration) to make tracking more difficult.
- Egress: Letting the user select the egress location and technology for this persona.

This is not an exhaustive list, but it does provide a sample of the sort of browser configuration options that are important for the user.

Figure 6:
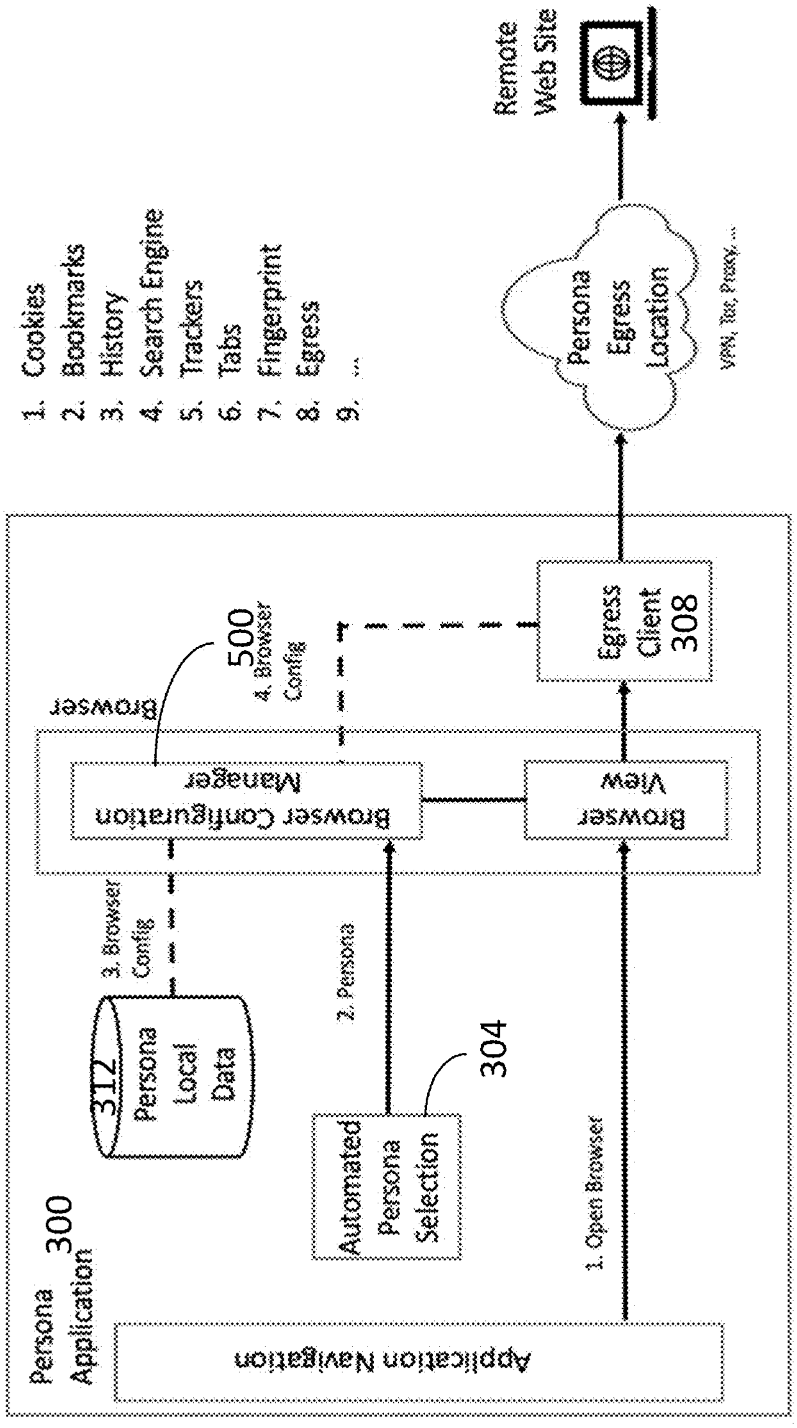
FIG. 6 illustrates loading privacy browser configuration data for a specified persona.

FIG. 6 shows how the browser is loaded with the browser configuration when it is first launched:

1. The user opens the browser.
2. The Automated Persona Selection component 304 selects the active persona.
3. The stored browser configuration within personal local data 312 is retrieved by the Browser Configuration Manager 500.
4. The stored egress configuration is loaded into the egress client 308.

During the operation of the browser by the user, the user is also given the option to modify the browser configuration settings.

A compliment to the Privacy Browser Configuration is the Privacy Browser State. It is concerned with the runtime state of the browser. This could include, e.g. active cookies, user selected bookmarks, history log, tracker whitelisting data, and active browser tabs. Each of these areas is part of the Privacy Browser State and is updated during the normal operation of the browser.

Figure 7:
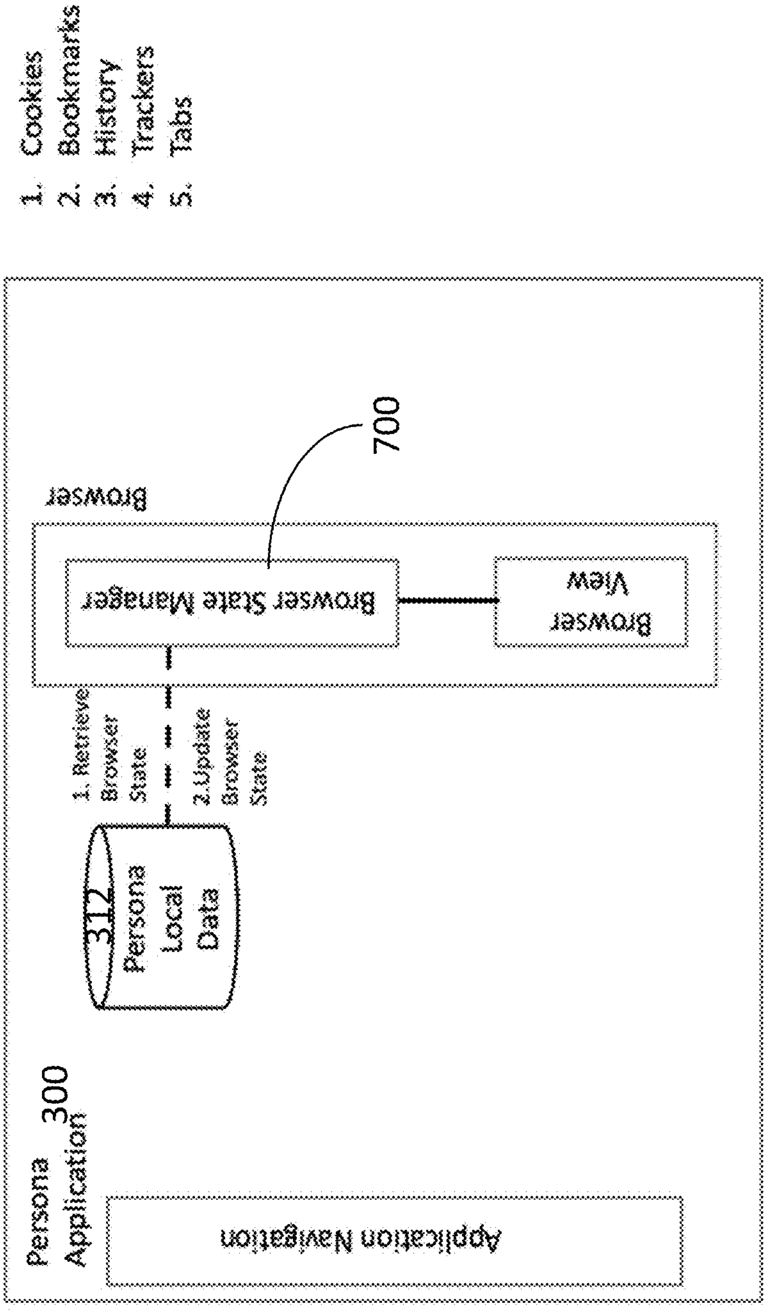
FIG. 7 illustrates managing state of a privacy browser.

FIG. 7 shows the management of the state of the Privacy Browser. After the configuration is loaded, as shown in FIG. 5, the state is then loaded:

1. The Browser State Manager 700 retrieves the Persona Based Browser State from persona local data 312. The Browser is configured with the new state. If this is a new Persona, then there will be an empty state. Once the Browser State is loaded into the browser then the user is free to work with the browser.
2. Once the user finishes the browser session, the Browser State is saved. That is, the Browser State Manager 700 updates the state in the Persona Local Data 312.

Figure 8:
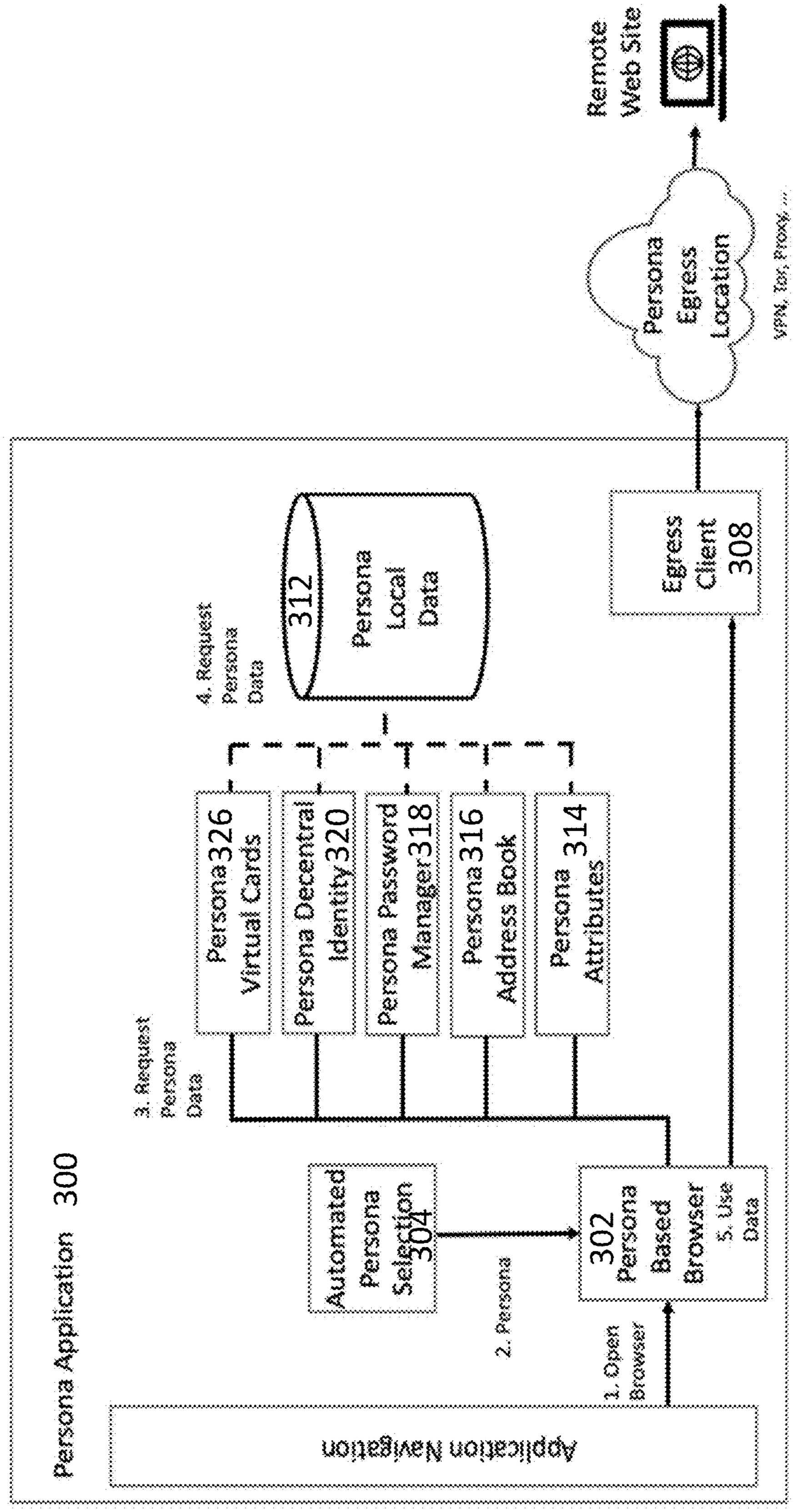
FIG. 8 illustrates privacy browser access to persona attribute data.

When the user is browsing, they user should have access to Persona specific attributes and data, e.g., for form filling. As shown in FIG. 8 this could include:

- persona attributes 314 (e.g., persona name, date of birth, email address, phone number, shipping address)
- persona address book 316 (contact information related to this persona)
- persona password management information 318 (e.g., login username and passwords for this persona's accounts)
- persona decentralized identity data 320 (e.g., verifiable credentials, private and public keys for this persona)
- persona issued virtual credit cards 326

The foregoing is a sample set of data; other data may be used in accordance with embodiments of the invention.

Figure 9:
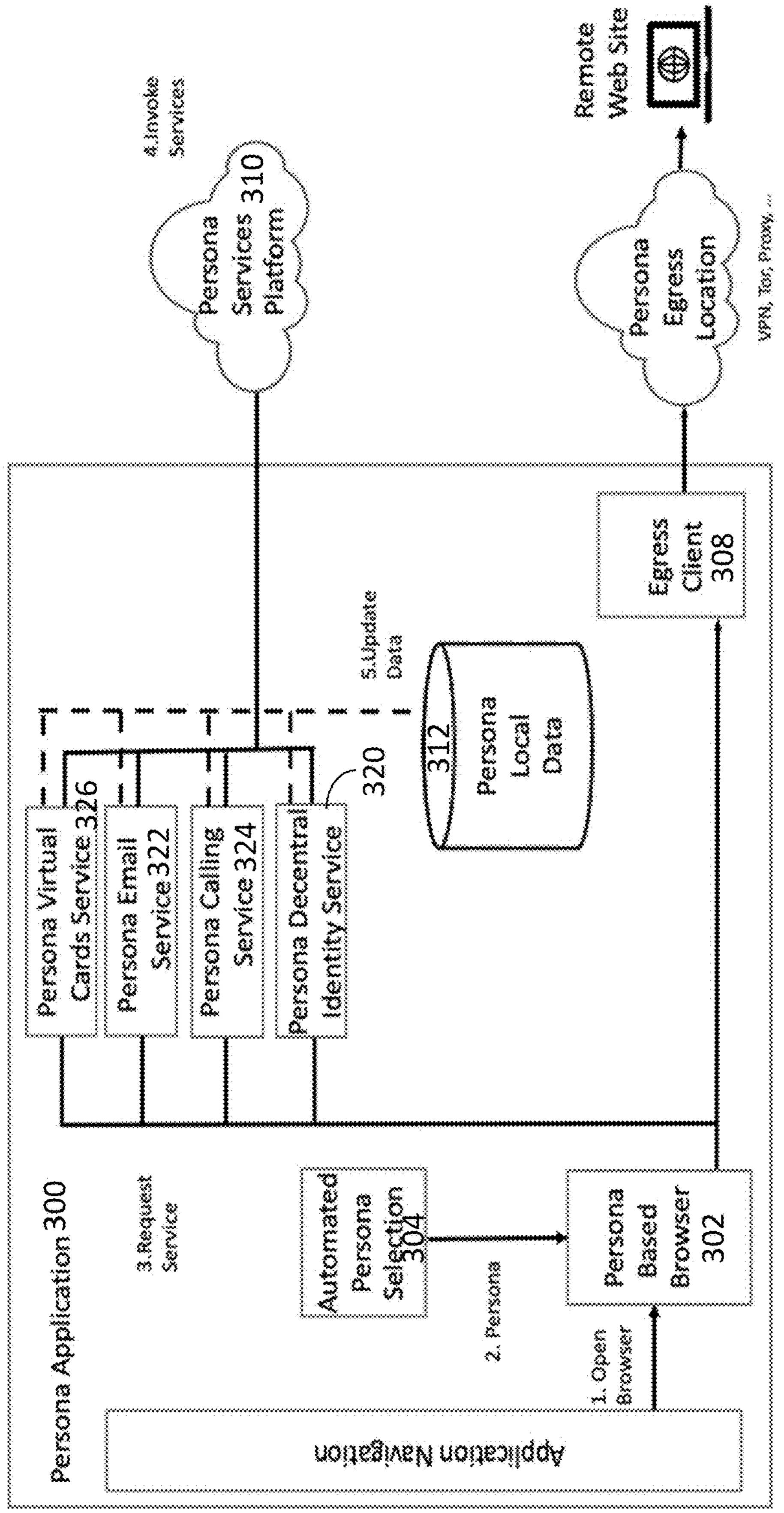
FIG. 9 illustrates a privacy browser launching persona based services.

Another requirement for the Privacy Browser is being able to initiate service requests to persona related services. FIG. 9 shows the steps involved to invoke Persona related services:

1. The user opens a browser.
2. The Automated Persona Selection component 304 selects the active persona.
3. The browser identifies the persona context (and loads up configuration and state information as previously described).
4. When there is a need for persona based service to be invoked, e.g. persona email 322, voice calling 324, virtual card service 326 or decentralized identity requirement 320, the browser calls into the appropriate service component.
5. The component invokes the service at the Persona Service Platform 310, e.g. sending an email, requesting a new virtual card.
6. The Persona Local Data 312 is updated for any new persona related data, e.g. new virtual credit card.

Figure 10:
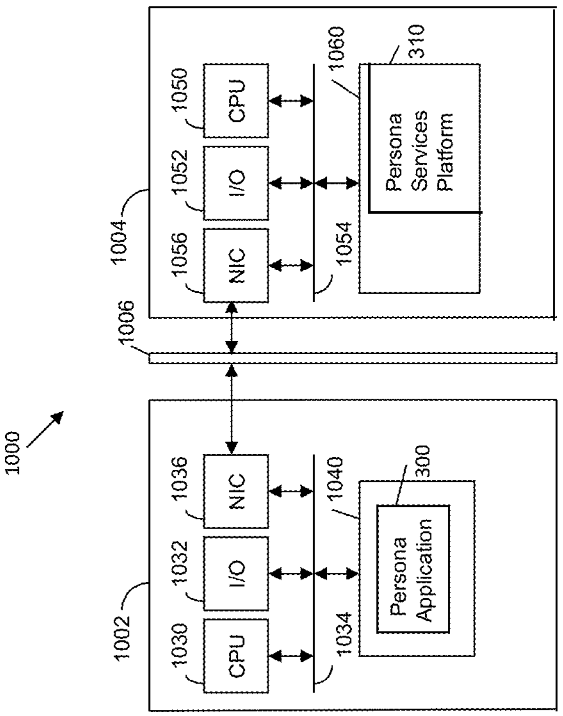
FIG. 10 illustrates machines configured in accordance with an embodiment of the invention.

FIG. 10 illustrates a system 1000 with components of the invention previously discussed. A client machine 1002 communicates with a server 1004 via a network 1006, which may be any combination of wired and wireless networks. The client machine 1002 includes a processor 1030 and input/output devices 1032 connected via a bus 1034. The input/output devices 1032 may include a keyboard, mouse, touch display and the like. A network interface circuit 1036 provides connectivity to network 1006. A memory 1040 is connected to bus 1034. The memory 1040 stores the persona application 300, which includes instructions executed by processor 1030 to implement operations disclosed herein.

The server 1004 includes a processor 1050, input/output devices 1052, bus 1054 and network interface circuit 1056. A memory 1060 is connected to bus 1054. The memory 1060 stores a persona service platform module 310 to implement operations disclosed herein.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

maintain different digital identities for different internet browsing personas associated with a real user, wherein the different internet browsing personas each have a unique persona virtual card, a persona email service, a persona password manager, and a fingerprint setting specifying whether browser state should be a static fingerprint based on actual browser technology and configuration or a variable fingerprint based on changed browser technology and configuration to make tracking more difficult;

invoke persona selection rules to automatically designate a selected digital identity for a current internet browsing session, wherein the persona selection rules include automatically generated rules produced by a learning engine that monitors the activity of the real user to establish new rules for the real user; and load browser state for the selected digital identity, wherein the browser state specifies whether trackers should be enabled and specifies configured whitelists for trackers.

2. The non-transitory computer readable storage medium of claim 1 wherein the persona selection rules automatically designate the selected digital identity based upon geographic location of a user device associated with the real user.

3. The non-transitory computer readable storage medium of claim 1 wherein the persona selection rules automatically designate the selected digital identity based upon time of day.

4. The non-transitory computer readable storage medium of claim 1 wherein the persona selection rules automatically designate the selected digital identity based upon network address of a user device associated with the real user.

5. The non-transitory computer readable storage medium of claim 1 wherein the persona selection rules automatically designate the selected digital identity based upon a uniform resource locator address.

6. The non-transitory computer readable storage medium of claim 1 wherein the different digital identities have different persona attributes.

7. The non-transitory computer readable storage medium of claim 1 wherein the different digital identities have different persona address books.

8. The non-transitory computer readable storage medium of claim 1 wherein the different digital identities have different persona password managers.

9. The non-transitory computer readable storage medium of claim 1 wherein the different digital identities have different persona decentralized identity services.

10. The non-transitory computer readable storage medium of claim 1 wherein the different digital identities have different persona calling services.

11. The non-transitory computer readable storage medium of claim 1 wherein the different digital identities have different persona email services.

12. The non-transitory computer readable storage medium of claim 1 wherein the different digital identities have different persona virtual card services.

13. The non-transitory computer readable storage medium of claim 1 wherein the different digital identities have different persona based egress clients.

* * * * *